(12) United States Patent
Lawley

(10) Patent No.: US 9,070,084 B2
(45) Date of Patent: Jun. 30, 2015

(54) MODIFICATION OF DESCRIPTION LOGIC EXPRESSIONS

(75) Inventor: Michael John Lawley, Brisbane (AU)

(73) Assignee: COMMONWEALTH SCIENTIFIC AND INDUSTRIAL RESEARCH ORGANISATION, Campbell (AU)

( * ) Notice: Subject to any disclaimer, the term of this patent is extended or adjusted under 35 U.S.C. 154(b) by 368 days.

(21) Appl. No.: 13/805,620

(22) PCT Filed: Jun. 21, 2011

(86) PCT No.: PCT/AU2011/000753
§ 371 (c)(1),
(2), (4) Date: Feb. 21, 2013

(87) PCT Pub. No.: WO2011/160171
PCT Pub. Date: Dec. 29, 2011

(65) Prior Publication Data
US 2013/0144828 A1 Jun. 6, 2013

(30) Foreign Application Priority Data

Jun. 21, 2010 (AU) ................................ 2010902719

(51) Int. Cl.
G06F 17/00 (2006.01)
G06N 5/02 (2006.01)
G06F 17/30 (2006.01)

(52) U.S. Cl.
CPC ............ *G06N 5/02* (2013.01); *G06F 17/30734* (2013.01)

(58) Field of Classification Search
CPC ... G06F 17/00; G06F 17/30734; G06F 15/18; G06N 5/02; G06N 5/022; G06N 5/025; G06N 5/027
USPC .......................................................... 706/46
See application file for complete search history.

(56) References Cited

U.S. PATENT DOCUMENTS 6,728,692 B1   4/2004   Martinka et al.
7,027,974 B1   4/2006   Busch et al.
(Continued)

OTHER PUBLICATIONS

'Selective Retrieval of Pre- and Post-coordinated SNOMED Concepts': Dolin, 2002, ACM, annual symposium proceesings. pp. 210-214.*

(Continued)

*Primary Examiner* — Kakali Chaki
*Assistant Examiner* — Peter Coughlan
(74) *Attorney, Agent, or Firm* — John P. White; Cooper & Dunham LLP

(57) ABSTRACT

A method, executed by a computer system, or altering a base expression associated with an ontology, the method including:
 generating a canonical expression from the base expression;
 modifying the canonical expression to generate a modified canonical expression, the modification being the addition, replacement or deletion of a target update expression segment;
 modifying the base expression to generate a modified base expression by adding a modification sub-expression to the base expression or deleting a modification sub-expression from the base expression, the modification sub-expression being determined at least in part from the target update expression segment;
 generating a comparison canonical expression from the modified base expression; and
 comparing the comparison canonical expression with the modified canonical expression to determine whether to substitute the base expression with the modified base expression.

20 Claims, 5 Drawing Sheets

(56) References Cited

U.S. PATENT DOCUMENTS

2007/0038609 A1    2/2007    Wu
2010/0131516 A1    5/2010    Jean-Mary
2010/0145946 A1*  6/2010    Conrad et al. ................ 707/736

OTHER PUBLICATIONS

'Declarative Transformation for Object-Oriented Models': Duddy, 2004, University of Queensland.*
'A Translation Approach to Portable Ontology Specifications': Gruber, 1993, Knowledge systems laboratory.*
'Toward Principles for the Design of Ontologies Used for Knowledge Sharing': Gruber, 1993, Stanford knowledge systems laboratory.*
'Building SNOMED CT Reference Sets for Use as Interface Terminologies': Hansen, 2011, electronic Journal of Health Informatics, ISSN 1446-4381.*
'Fast Classification in Protege: Snorocket as an OWL 2 EL Reasoner': Lawley, 2010, Proceedings of the Sixth Australasian Ontology Workshop p. 45-48.*
'Program Transformation for Proving Database Transaction Safety': Lawley, 1998, Queensland University.*
'Exploiting Fast Classification of SNOMED CT for Query and Integration of Health Data': Lawley, 2008, KR-MED 2008.*
'Converting ad hoc terminologies to SNOMED CT extensions': Lawley, 2008, Proceedings of the health informatics.*
Gruber, T. R. (1993). Toward principles for the design of ontologies used for knowledge sharing. Retrieved from http://tomgruber.org/writing/onto-design.pdf.
Gruber, T. R. (1993). A translation approach to portable ontology specifications. Retrieved from http://tomgruber.org/writing/ontolingua-kaj-1993.pdf.
International Search Report, mailed Aug. 4, 2011 in connection with PCT International Application No. PCT/AU2011/000753, filed Jun. 21, 2011.

* cited by examiner

MODIFICATION OF DESCRIPTION LOGIC EXPRESSIONS

CROSS-REFERENCE TO RELATED APPLICATIONS

This application is a §371 national stage of PCT International Application No. PCT/AU2011/000753, filed Jun. 21, 2011, claiming priority of Australian Patent Application No. 2010902719, filed Jun. 21, 2010, the contents of each of which are hereby incorporated by reference in their entirety.

FIELD

The present invention relates to computer systems and methods for modifying description logic expressions, such as those which represent or express concepts from a defined ontology.

BACKGROUND

Computer systems are developed to execute analytical processes to assist, as much as possible, in determining outcomes or actions to be taken based on state data associated with a particular situation. To enable the processes to be executed optimally based on data available in relation to a knowledge domain, computer science has needed to develop technical language structures that can be interpreted and processed by computer, i.e. a logic machine. Accordingly, computer science uses ontologies to provide a strict or formal representation of concepts in a knowledge domain and relationships between those concepts to enable them to be interpreted, processed and operated on by a computer.

Concepts from an ontology may be combined to form an expression which follows a set of rules from a formal description logic. These expressions are part of an ontology language. An example of an ontology language is the Web Ontology Language (OWL). An example of an ontology is the Systematized Nomenclature of Medicine—Clinical Terms (SNOMED CT).

Ontologies define concepts and relationships, and ontology languages express a combination of those concepts and relationships. The semantic content of an expression in an ontology language may be understood with reference to the ontology. For example, the semantic content of the expression "fracture of left femur" in an ontology language may be formally expressed as representing the following structured concepts and relationships:

```
"fracture of left femur" ≡
    disease : {
        associated morphology = fracture,
        finding site = (
            bone structure of femur :
                laterality = left
        )
    }
```

The ontology assists in interpreting the expression "fracture of the left femur" by making explicit the implicit relationships within the expression. For example, it is implicit in the expression that the nature of the injury is a fracture (i.e. it is the associated morphology). Similarly, it is implicit that "femur" is used to denote a location of the injury (i.e. the finding site), and "left" is used to denote the laterality of the location on the femur. The concepts of "fracture", "femur" and "left" are defined in the ontology.

Another example is the expression "gastrointestinal haemorrhage by trauma". This may be formally expressed by reference to an ontology as follows:

```
"gastrointestinal haemorrhage by trauma" ≡
    disease : {
        associated morphology = haemorrhage,
            finding site = gastrointestinal tract structure
    },
    due to = traumatic injury
```

Another way of formally expressing "gastrointestinal haemorrhage by trauma" is as follows:

"gastrointestinal haemorrhage by trauma"≡
   gastrointestinal haemorrhage:
      due to=traumatic injury It can be seen from the above that the formal expression of basic ontology expressions involves making explicit the implicit relationships between the concepts identified within the basic expressions.

When extending or modifying an ontology, it is often useful to be able to ensure that a basic form of an expression matches a formal, explicit (or "canonical" form) of the expression, so that subsequent machine interpretation of the basic form does not rely on inaccurate implicit relationships in the basic form. Existing editing tools for establishing, editing and refining ontologies are primarily text based tools which allow direct editing of the basic form without any strict control or machine analysis of the syntax or the expression. Also, whilst an inferred or canonical form of the expression may be presented, it is purely a separate informational display.

It is desired to address the shortcomings of the prior art, or at least provide a useful alternative.

SUMMARY

The present invention provides a method, executed by a computer system, for altering a base expression associated with an ontology, the method including:
   generating a canonical expression from the base expression;
   modifying the canonical expression to generate a modified canonical expression, the modification being the addition, replacement or deletion of a target update expression segment;
   modifying the base expression to generate a modified base expression by adding a modification sub-expression to the base expression or deleting a modification sub-expression from the base expression, the modification sub-expression being determined at least in part from the target update expression segment;
   generating a comparison canonical expression from the modified base expression; and
   comparing the comparison canonical expression with the modified canonical expression to determine whether to substitute the base expression with the modified base expression.

The present invention also provides a method, executed by a computer system, for altering a base expression associated with an ontology, the method including the steps of:
   generating a canonical expression from the base expression;
   modifying the canonical expression to generate a modified canonical expression, the modification being the replacement of a target update expression segment in the canonical expression with a canonical source update expression segment generated from a source update expression segment;

identifying a modification sub-expression within the canonical expression which includes one or more elements, and which includes the target update expression segment;

modifying the base expression to generate a modified base expression by
  adding the modification sub-expression to the base expression to form an interim base expression; and
  replacing the target update expression segment with the source update expression segment in the interim base expression;

generating a comparison canonical expression from the modified base expression; and comparing the comparison canonical expression with the modified canonical expression to determine whether to substitute the base expression with the modified based expression.

The present invention also provides a computing system for altering a base expression associated with an ontology, the computing system including:

a first expression expander for expanding a base expression into a canonical expression;

a canonical expression modifier for modifying the canonical expression to generate a modified canonical expression, the modification being the addition, replacement or deletion of a target update expression segment;

a base expression modifier for modifying the base expression to generate a modified base expression by adding a modification sub-expression to the base expression or deleting a modification sub-expression from the base expression, the modification sub-expression being determined in part from the target update expression segment;

a second expression expander for expanding the modified base expression into a comparison canonical expression; and an expression comparator for comparing the comparison canonical expression with the modified canonical expression to determine whether to substitute the base expression with the modified base expression.

DRAWINGS

Preferred embodiments of the present invention are hereinafter described, by way of example only, with reference to the accompanying drawings, wherein.

DESCRIPTION

In a preferred embodiment of the present invention a base expression of a stored ontology is modified, refined or extended to generate a modified base expression which may be substituted for the base expression in the stored ontology. The base expression is interpreted with respect to the stored ontology and may be part of it, stored separately in computer memory or merely constructed during data processing and only stored temporarily, e.g., in RAM.

Expressions in an ontology language may be represented in an abstract form, with letters representing the elements of the expression. An example of a base expression is:

[Gastrointestinal haemorrhage,due to=traumatic injury (disorder)]

This expression may be usefully represented in an abstract form as follows:

[A,B=C]

where A=gastrointestinal haemorrhage, B=due to, and C=traumatic injury (disorder). As such expressions follow a formal description logic, they may be manipulated using defined operators.

In addition, such base expressions generally consist of explicit elements such as concepts and attributes. However, the implicit parts of a base expression may be generated from the base expression using a stored ontology to which the base expression relates. For example, the implicit parts of the base expression above relating to a gastrointestinal haemorrhage may be generated from a stored ontology, and in turn a canonical form of the base expression may be generated. A canonical form of the above base expression may be:

[Gastrointestinal haemorrhage,[finding site=gastrointestinal tract structure,associated morphology=haemorrhage],due to=traumatic injury]

The sub-expressions "finding site=gastrointestinal tract, structure" and "associated morphology=haemorrhage" are generated from the base expression using a stored ontology.

Canonical expressions may be generated from base expressions using a function that is dependent on the stored ontology. Such a function may satisfy the property:

function(expression)=function(function(expression)+expression)

As a canonical expression may be considered an expanded form of a base expression, the function for converting a base expression into a canonical expression will, be identified as the expand function Where a base expression is intended to be extended, modified, or refined, it is useful to be able to alter the base expression by altering a canonical expression that corresponds to the base expression (that is, was generated from the base expression). Editing the canonical expression, rather than the base expression, enables editing to be done on a form of the expression which contains both the explicit parts of the expression and those implicit sub-expressions generated using the stored ontology.

Figure 1:
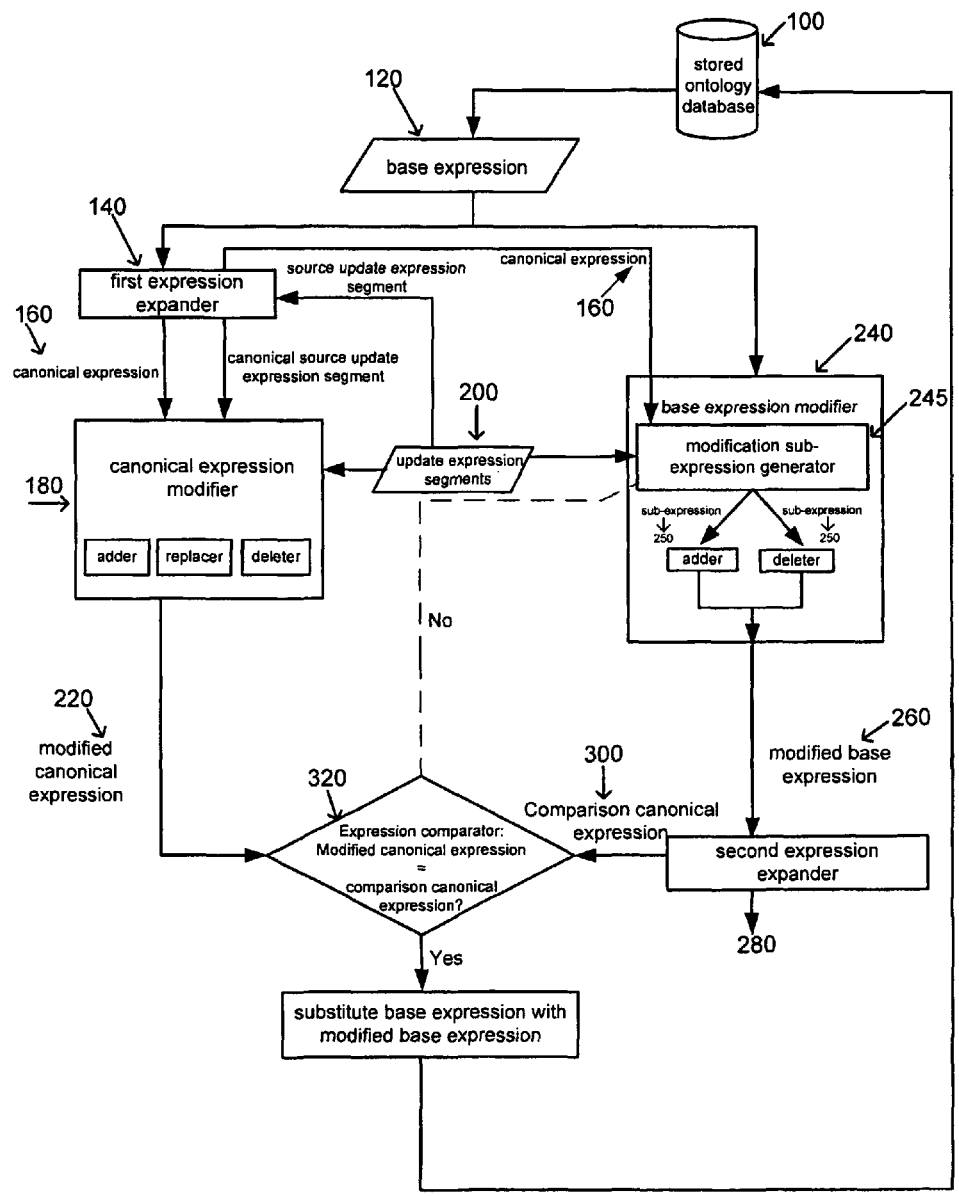
FIG. 1 is an illustration of a system for altering a base expression of a stored ontology having separate first and second expression expanders.

Turning now to FIG. 1, in one embodiment of the invention a base expression 120 is retrieved from a stored ontology database 100, and is passed to a first expression expander 140, which uses the expand function to generate a canonical expression 160 from the base expression 120. The expand function is dependent on the ontology stored in the stored ontology database 100.

The base expression 120 may be in the form [A, B=C]:

Base expression=[A,B=C]

The expand function is used by the first expression expander 140 to generate a canonical expression 160, which may be in the following form:

Canonical expression=[D,B=C,[E=F,G=H]]

It is this canonical expression 160 that will be modified by a canonical expression modifier 180. The canonical expression modifier 180 may modify the canonical expression 160 following instructions received through a graphical user interface. As illustrated in FIG. 5, the graphical user interface may enable a user to provide instructions to the canonical expression modifier 180 using a drag-and-drop metaphor. The user can modify the elements in the canonical expression 160, and their relationship, by using a pointing device, such as a mouse 318, to, select and move elements depicted on a video display unit 322 (see FIG. 4).

Figure 2:
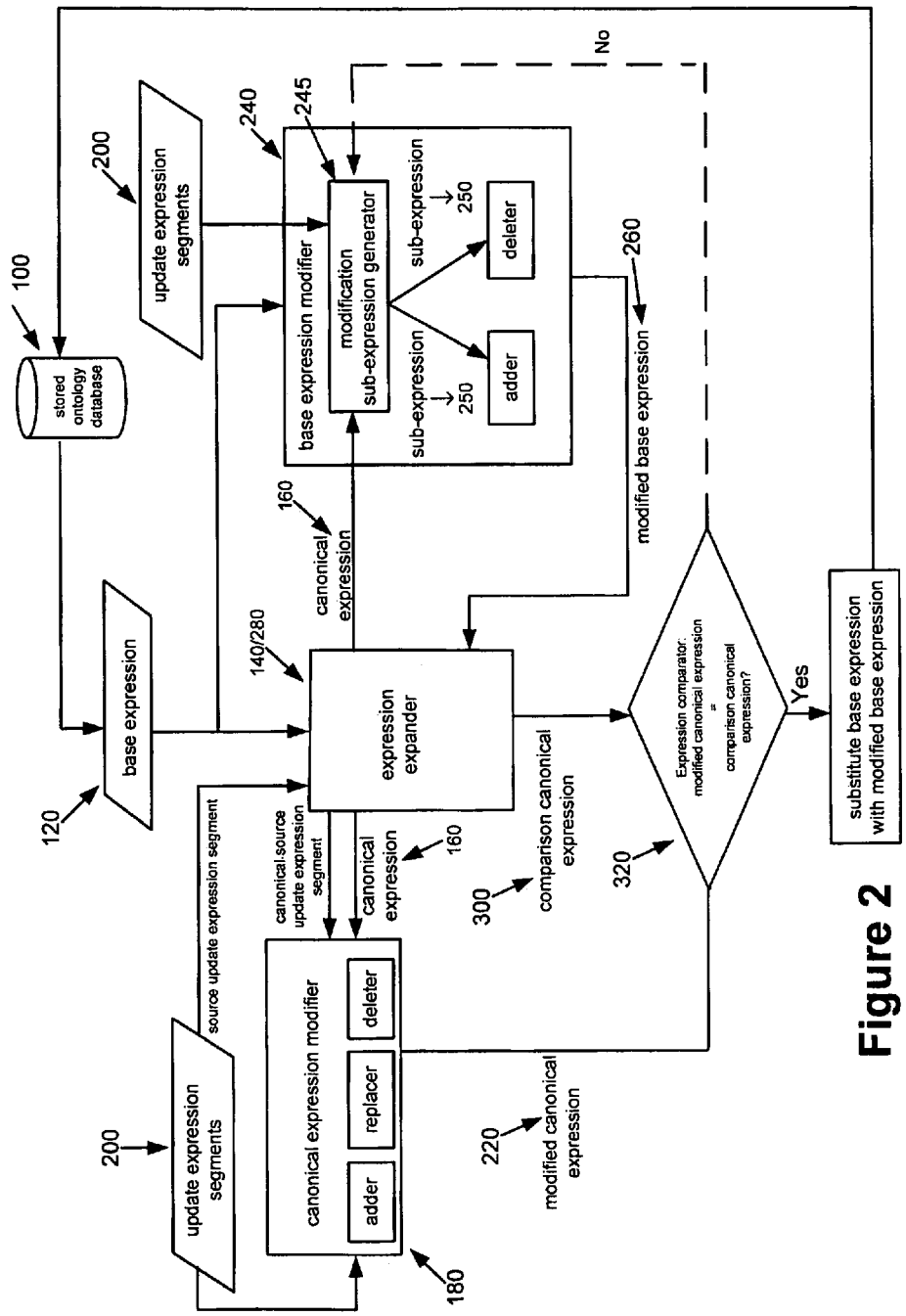
FIG. 2 is an illustration of a system for altering a base expression of a stored ontology having a shared expression expander.

The canonical expression 160 may be modified by adding to it a sub-expression. Alternatively, canonical expression 160 may be modified by deleting or removing a sub-expression from it. Furthermore, the canonical expression 160 may be modified by replacing a part of the canonical expression 160 (a target update expression segment) with another expression (a source update expression segment or a canonical source update expression segment). The update expression segments are identified by numeral 200 in FIG. 1. Where a target expression segment is to be replaced by a source update expression segment, both the source update expression segment and the target update expression segment are passed to the canonical expression modifier 180, as illustrated in FIGS. 1 and 2. Where a sub-expression or segment is to be added to or deleted from the canonical expression 160, the source update expression segment is the same as the target update expression segment and corresponds to the added or deleted sub-expression.

The canonical expression modifier 180, which takes as input the canonical expression 160 and the update expression segments 200, generates a modified canonical expression 220 using instructions received through a graphical user interface. The user may wish to replace element H with element J in base expression 120. That is, element H is the target update expression segment and element J is the source update expression segment. As it is the canonical expression 160 that is being modified by the canonical expression modifier 180, a canonical form of the source update expression segment, generated from the source update expression segment (using the expression expander 120), must be used when modifying the canonical expression 160. The canonical form of element J (that is, the canonical source update expression segment) is [J, K=L] Accordingly; the modified canonical expression 220 becomes:

Modified canonical expression = canonical expression, with target update expression segment replaced with canonical source update expression segment;

= [D, B = C, [E = F, G = H]], with

H replaced with [J, K = L]

= $\begin{bmatrix} D, B = C, \\ [E = F, G = [J, K = L]] \end{bmatrix}$

The base expression 120 is also passed to a base expression modifier 240. The base expression modifier 240 also takes as input the update expression segments 200. The base expression modifier 240 includes a modification sub-expression generator 245 for generating a modification sub-expression 250.

The modification sub-expression 250 is generated from a sub-expression in the canonical expression 160 containing the target update expression segment and having the smallest possible number of elements. In the present example, the target update expression segment is element H.

In a first embodiment, the modification sub-expression 250 is the sub-expression in the canonical expression 160 containing the target update expression segment and having the smallest possible number of elements, where the target update expression segment with the source update expression segment. In the present example, the sub-expression in the canonical expression 160 containing the target update expression segment and having the smallest possible number of elements, is G=H. Accordingly, the modification sub-expression 250 is sub-expression G=H with the target update expression segment H replaced with the source update expression segment J. In the present example as applicable to this embodiment, the modification sub-expression 250 is G=J.

The modified base expression 260 is generated by adding the modification sub-expression 250 to the base expression 120, or deleting the modification sub-expression 250 from the base expression 120. In the present example, we are replacing a target update expression segment with a source update expression segment. Accordingly, the modification sub-expression 250 must be added to the base expression 120 to form the modified base expression 260. If a target update expression segment was to be deleted from the canonical expression 160, then the modified base expression 260 would be generated by deleting the modification sub-expression 250 from the base expression 120.

The modified base expression 260 in the present example is therefore:

modified base expression = base expression + modification sub-expression

= [A, B = C] + [G = J]

= [A, B = C, G = J].

In second embodiment, the modification sub-expression 250 is the sub-expression in the canonical expression 160 containing the target update expression segment and having the smallest possible number of elements, that is, G=H. In this embodiment, the base expression 120 is modified by adding the modification sub-expression 250 to the base expression 120 to form an interim base expression, and then replacing the target update expression segment (H) with the source update expression segment (J) in the interim base expression.

interim base expression = base expression + modification sub-expression

= [A, B = C] + [G = H]

= [A, B = C, G = H]

-continued $$\begin{aligned}\text{modified base expression} &= \text{interim base expression with target}\\ &\quad \text{expression segment replaced by}\\ &\quad \text{source expression segment}\\ &= [A, B = C, G = H] \text{ with } H\\ &\quad \text{replaced by } J\\ &= [A, B = C, G = J]\end{aligned}$$

The modified base expression 260 for this second embodiment is the same as the modified base expression 260 for the first embodiment described above.

The modified base expression 260 is passed to a second expression expander 280. Like the first expression expander 140, the second expression expander 280 uses the expand function to expand a base expression into a canonical expression, in this case converting the modified base expression 260 into a comparison canonical expression 300. The second expression expander 280 may be the same as the first expression expander 140, as illustrated in FIG. 2.

In the present example the, comparison canonical expression 300 is the canonical form of the modified base expression 260:

$$\begin{aligned}\text{comparison canonical expression} &= \text{expand (modified base expression)}\\ &= \text{expand } (A, B = C, G = J)\\ &= \begin{bmatrix} D, B = C, G = [J, K = L],\\ [E = F, G = H] \end{bmatrix}\end{aligned}$$

The comparison canonical expression 300 is passed to an expression comparator 320. The expression comparator 320 also has as an input the modified canonical expression 220 received from the canonical expression modifier 180. The expression comparator 320 determines whether the modified canonical expression 220 is the same as the comparison canonical expression 300. If the modified canonical expression 220 is the same as the comparison canonical expression 300, the modified base expression 260 corresponds to the modified canonical expression 220, and the modified base expression 260 may be stored in the stored ontology database 100. However, if the modified canonical expression 220 is not the same as the modified base expression 260, the expression comparator 320 signals the base expression modifier 240 to indicate that another modification sub-expression 250 must be generated.

The steps of modifying the base expression 120, generating a comparison canonical expression 300 and comparing the canonical expression 300 with the modified canonical expression 220 are sequentially repeated, the modification sub-expression 250 being modified to include a larger number of elements with each repetition, until the comparison canonical expression 300 matches the modified canonical expression 220.

In the first iteration of our example described above, the modification sub-expression 250 was G=J in the first embodiment and G=H in the second embodiment. Considering only the second embodiment for the purposes of illustration, the modification sub-expression 250 will be a sub-expression of the canonical expression 220 that contains the target update expression segment H, but has more elements than the modification sub-expression 250 of the first iteration. The next largest sub-expression is [E=F, G=H].

$$\begin{aligned}\text{interim base expression} &= \text{base expression} + \text{modification}\\ &\quad \text{sub-expression}\\ &= [A, B = C] + [E = F, G = H]\\ &= [A, B = C, [E = F, G = H]]\end{aligned}$$

$$\begin{aligned}\text{modified base expression} &= \text{interim base expression with}\\ &\quad \text{target expression segment}\\ &\quad \text{replaced by source expression}\\ &\quad \text{segment}\\ &= [A, B = C, [E = F, G = H]]\\ &\quad \text{with } H \text{ replaced by } J\\ &= [A, B = C, [E = F, G = J]]\end{aligned}$$

$$\begin{aligned}\text{comparison canonical expression} &= \text{expand (modified base expression)}\\ &= \text{expand } ([A, B = C, [E = F, G = J]])\\ &= [D, B = C, [E = F, G = [J, K = L]]]\end{aligned}$$

The resulting comparison canonical expression 300 is the same as modified canonical expression 220. The modified base expression 260 corresponds with modified canonical expression 220, and therefore may be stored in stored ontology database 100.

Figure 3:
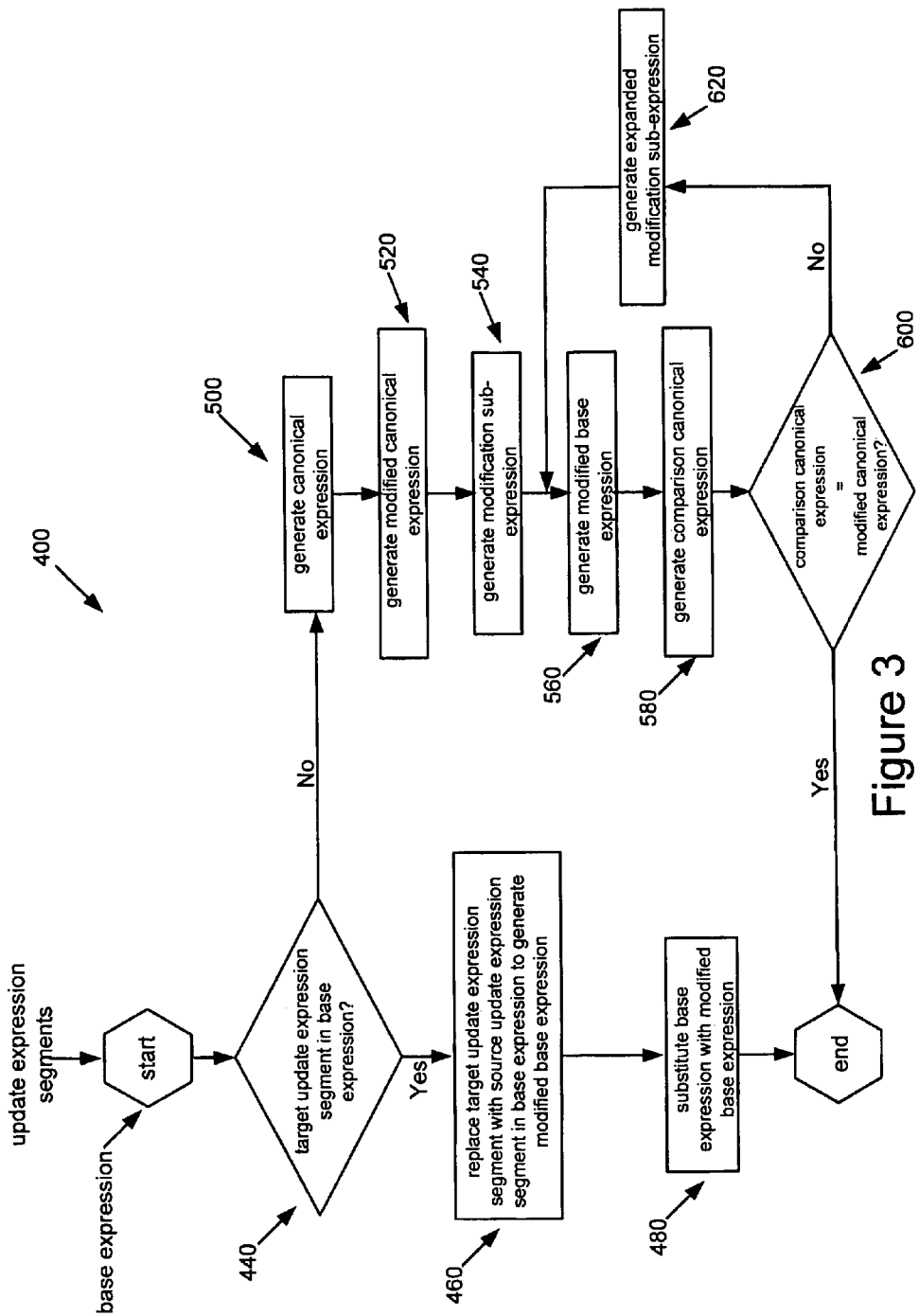
FIG. 3 is a flow chart illustrating a process for altering a base expression of a stored ontology.

The process 400 described above for the replacement of a target update expression segment with a source update expression segment is illustrated in FIG. 3. At step 440, it is determined whether the target update expression segment is in the base expression 120. If the target update expression segment is in the base expression 120, the target update expression segment is replaced with the source update expression segment in the base expression 120 to generate a modified base expression 260 (step 460). The base expression 120 is then substituted with the modified base expression 260 in the stored ontology database 100 (step 480).

However if the target update expression segment is not in the base expression 120, a canonical expression 160 is generated (step 500). At step 520 a modified canonical expression is generated by the replacement of the target update expression segment with the source update expression segment in the canonical expression 160. A modification sub-expression is then generated from a sub-expression in the canonical expression containing the target update expression segment and having the smallest number of elements (step 540). A modified base expression is then generated, for example, by adding the modification sub-expression 250 to the base expression 120 (step 560). At step 580, a comparison canonical expression 300 and is generated from the modified base expression 260 and compared with the modified canonical expression 220 (step 600). If the comparison canonical expression 300 is the same as the modified canonical expression 220, the modified base expression 260 is substituted for the base expression 120 in the stored ontology database 100 (step 480). However if the comparison canonical expression 300 is not the same as the modified canonical expression 220, an expanded modification sub-expression is generated (step 620). Steps are 560, 580, 600, and 620 are repeated until the comparison canonical expression 300 is the same as the modified canonical expression 220.

Figure 4:
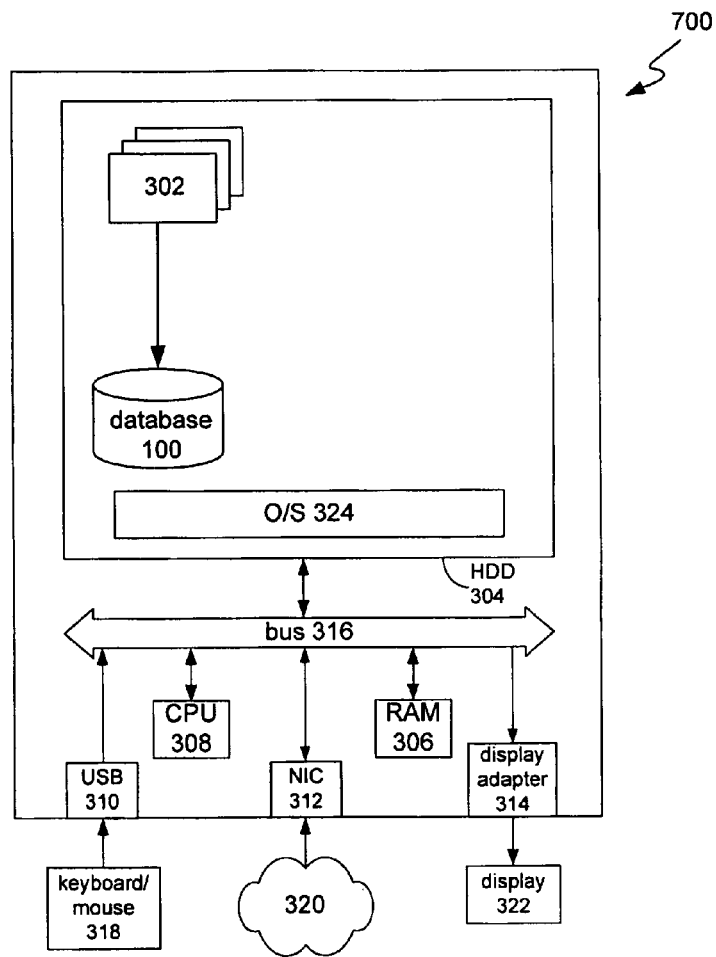
FIG. 4 is an illustration of an exemplary computing environment in which the systems of FIGS. 1 and 2 may be implemented.
Figure 5:
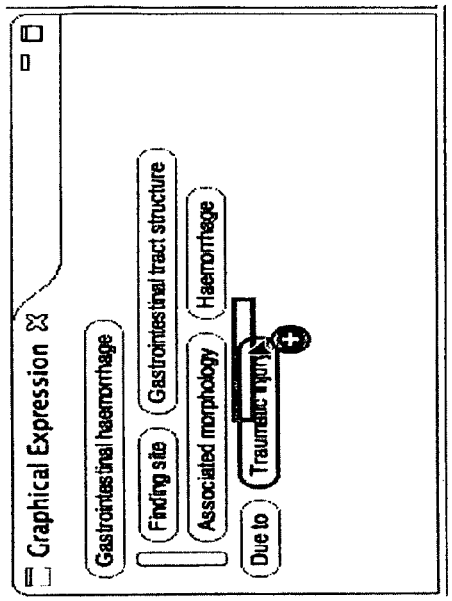
FIG. 5 is an illustration of an exemplary graphical user interface for use with the systems of FIGS. 1 and 2.
Figure 5:
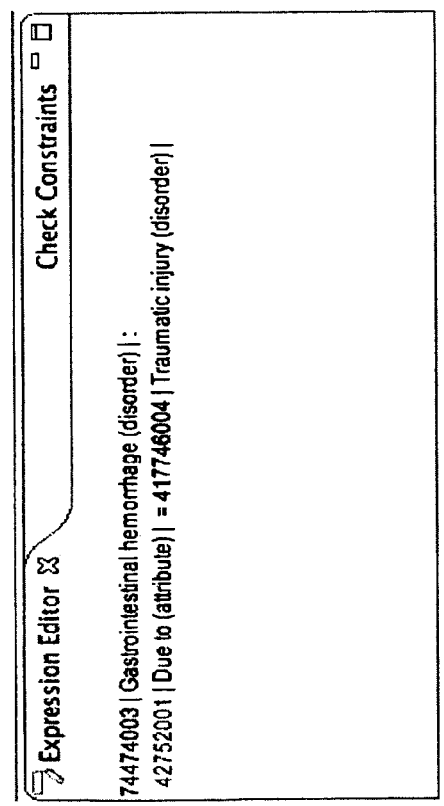

The embodiments of the invention described above may be implemented in a standard computer system 700 such as an 32-bit or 64-bit Intel Architecture based computer system, as shown in FIG. 4, and the process 400 executed by the system 300 is implemented in the form of programming instructions of one or more software modules 302 stored on non-volatile (e.g., hard disk) storage 304 associated with the computer system, as shown in FIG. 4. However, it will be apparent that at least parts of the process 400 could alternatively be implemented as one or more dedicated hardware components, such as application-specific integrated circuits (ASICs) and/or field programmable gate arrays (FPGAs). The software modules 302 may be Java classes implementing one or more of a first expression expander 140, a second expression expander 280, a canonical expression modifier 180, a base expression modifier 240 (including a modification sub-expression generator 245) and an expression comparator 320.

The system 700 includes standard computer components, including random access memory (RAM) 306, at least one processor 308, and external interfaces 310, 312, 314, all interconnected by a bus 316. The external interfaces include universal serial bus (USB) interfaces 310, at least one of which is connected to a keyboard and a pointing device such as a mouse 318, a network interface connector (NIC) 312 which connects the system 300 to a communications network such as the Internet 320, and a display adapter 314, which is connected to a display device such as an LCD panel display 322.

The system 300 also includes a number of standard software modules, including an operating system 324 such as Linux or Microsoft Windows. The database 100 containing the stored ontology may be stored on the hard disk 304, or may be external to computer system 700 and accessed using the USB interface 310 or the NIC 312.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A method, executed by a computer system, for altering a base expression associated with an ontology, the method comprising:
    generating a canonical expression from the base expression;
    modifying the canonical expression to generate a modified canonical expression, the modification being the addition, replacement or deletion of a target update expression segment;
    modifying the base expression to generate a modified base expression by adding a modification sub-expression to the base expression or deleting a modification sub-expression from the base expression, the modification sub-expression being determined at least in part from the target update expression segment;
    generating a comparison canonical expression from the modified base expression; and
    comparing the comparison canonical expression with the modified canonical expression to determine whether to substitute the base expression with the modified base expression.

2. A method of claim 1, wherein the steps of modifying the base expression, generating a comparison canonical expression and comparing the comparison canonical expression with the modified canonical expression are sequentially repeated, the modification sub-expression including one or more elements and being modified to include a larger number of elements with each repetition, until the comparison canonical expression matches the modified canonical expression.

3. A method of claim 2, wherein the modification sub-expression is initially generated from a sub-expression in the canonical expression containing the target update expression segment and having the smallest number of elements.

4. A method of claim 2, further comprising the steps of:
    retrieving the base expression from a database storing ontology expressions before a canonical expression is generated from it; and
    storing the last modified base expression in the database when the comparison canonical expression matches the modified canonical expression.

5. A method of claim 1, wherein the steps of generating the canonical expression from the base expression and generating the comparison canonical expression from the modified base expression include the execution of a function that is dependent on the stored ontology.

6. A method of claim 5, wherein the function satisfies the property:

$$\text{function(expression)}==\text{function(function(expression)+expression)}.$$

7. A method of claim 5, wherein the canonical expression includes sub-expressions generated from the base expression using the stored ontology.

8. A method of claim 1, wherein the canonical expression and base expression comply with the rules of a formal description logic.

9. A method of claim 1, wherein the step of modifying the canonical expression includes the step of receiving instructions through a graphical user interface to modify the canonical expression.

10. A computer system for executing computer-implementable instructions, the computer system being configured to execute computer-implementable instructions for implementing a method of claim preceding claim 1.

11. A non-transitory computer-readable medium storing computer-implementable instructions, the execution of which by a computer system would result in the execution of a method of claim 1.

12. A method, executed by a computer system, for altering a base expression associated with an ontology, the method comprising the steps of:
    generating a canonical expression from the base expression;
    modifying the canonical expression to generate a modified canonical expression, the modification being the replacement of a target update expression segment in the canonical expression with a canonical source update expression segment generated from a source update expression segment;
    identifying a modification sub-expression within the canonical expression which includes one or more elements, and which includes the target update expression segment;
    modifying the base expression to generate a modified base expression by
        adding the modification sub-expression to the base expression to form an interim base expression; and
        replacing the target update expression segment with the source update expression segment in the interim base expression;
    generating a comparison canonical expression from the modified base expression; and comparing the comparison canonical expression with the modified canonical expression to determine whether to substitute the base expression with the modified based expression.

13. A computer system for executing computer-implementable instructions, the computer system being configured to execute computer-implementable instructions for implementing a method of claim 12.

14. A non-transitory computer-readable medium storing computer-implementable instructions, the execution of which by a computer system would result in the execution of a method of claim 10.

15. A computing system for altering a base expression associated with an ontology, the computing system including:
- a first expression expander for expanding a base expression into a canonical expression;
- a canonical expression modifier for modifying the canonical expression to generate a modified canonical expression, the modification being the addition, replacement or deletion of a target update expression segment;
- a base expression modifier for modifying the base expression to generate a modified base expression by adding a modification sub-expression to the base expression or deleting a modification sub-expression from the base expression, the modification sub-expression being determined in part from the target update expression segment;
- a second expression expander for expanding the modified base expression into a comparison canonical expression; and
- an expression comparator for comparing the comparison canonical expression with the modified canonical expression to determine whether to substitute the base expression with the modified base expression.

16. A computing system of claim 15, wherein the modification sub-expression includes one or more elements, and the base expression modifier is configured to generate a sub-expression containing the target update expression segment and having the smallest number of elements.

17. A computing system of claim 16, wherein the first expression expander and the second expression expander execute a function that relies on a defined ontology.

18. A computing system of claim 15, wherein the first expression expander and the second expression expander execute a function that relies on a defined ontology.

19. A computing system of claim 18, wherein the function satisfies the property:

$$\text{function}(\text{expression}) == \text{function}(\text{function}(\text{expression}) + \text{expression}).$$

20. A computing system of claim 15 further comprising a graphical user interface for modifying the canonical expression.

* * * * *